United States Patent
Rheaume (10) Patent No.: US 11,258,083 B2
(45) Date of Patent: Feb. 22, 2022

(54) ON-BOARD AIRCRAFT ELECTROCHEMICAL SYSTEM

(71) Applicant: Hamilton Sundstrand Corporation, Charlotte, NC (US)

(72) Inventor: Jonathan Rheaume, West Hartford, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 0 days.

(21) Appl. No.: 16/410,574

(22) Filed: May 13, 2019

(65) Prior Publication Data

US 2019/0267651 A1    Aug. 29, 2019

Related U.S. Application Data

(62) Division of application No. 15/151,132, filed on May 10, 2016, now Pat. No. 10,312,536.

(51) Int. Cl.
*H01M 8/04746* (2016.01)
*A62C 3/08* (2006.01)
(Continued)

(52) U.S. Cl.
CPC .......... *H01M 8/04753* (2013.01); *A62C 3/08* (2013.01); *A62C 99/0018* (2013.01);
(Continued)

(58) Field of Classification Search
None
See application file for complete search history.

(56) References Cited

U.S. PATENT DOCUMENTS 2,845,383 A    7/1958  Bowles, Jr. et al.
2,964,916 A    12/1960 Keeping
(Continued)

FOREIGN PATENT DOCUMENTS

DE         4225170 A1    2/1994
DE    102009040013 A1    3/2011
(Continued)

OTHER PUBLICATIONS

Ikezoe et al. (JP, 2004-022487) (a raw machine translation) (Abstract, Detailed Description and Drawings) (Jan. 22, 2004) (Year : 2004).*
(Continued)

*Primary Examiner* — Carmen V Lyles-Irving
(74) *Attorney, Agent, or Firm* — Cantor Colburn LLP (57) ABSTRACT

An onboard electrochemical system of an electrochemical cell including a cathode and an anode separated by an electrolyte separator is selectively operated in either of two modes. In a first mode of operation, water or air is directed to the anode, electric power is provided to the anode and cathode to provide a voltage difference between the anode and the cathode, and nitrogen-enriched air is directed from the cathode to an aircraft fuel tank or aircraft fire suppression system. In a second mode of operation, fuel is directed to the anode, electric power is directed from the anode and cathode to one or more aircraft electric power-consuming systems or components, and nitrogen-enriched air is directed from the cathode to a fuel tank or fire suppression system.

20 Claims, 4 Drawing Sheets

(51) Int. Cl.
*A62C 99/00* (2010.01)
*B64D 37/32* (2006.01)
*H01M 8/1231* (2016.01)
*H01M 8/04082* (2016.01)
*H01M 8/04858* (2016.01)
*B64D 41/00* (2006.01)
*C25B 1/04* (2021.01)
*B64D 45/00* (2006.01)

(52) U.S. Cl.
CPC ........ *B64D 37/32* (2013.01); *H01M 8/04201* (2013.01); *H01M 8/04761* (2013.01); *H01M 8/04865* (2013.01); *H01M 8/1231* (2016.02); *B64D 2041/005* (2013.01); *B64D 2045/009* (2013.01); *C25B 1/04* (2013.01); *H01M 2250/20* (2013.01); *Y02T 90/40* (2013.01)

(56) References Cited

U.S. PATENT DOCUMENTS

| | | |
|---|---|---|
| 3,590,559 A | 7/1971 | Bragg et al. |
| 3,672,180 A | 6/1972 | Davis |
| 3,710,549 A | 1/1973 | Nichols et al. |
| 3,732,668 A | 5/1973 | Nichols |
| 3,788,039 A | 1/1974 | Bragg |
| 3,788,040 A | 1/1974 | Bragg et al. |
| 3,847,298 A | 11/1974 | Hamilton |
| 3,901,025 A | 8/1975 | Bryerton et al. |
| 4,556,180 A | 12/1985 | Manatt |
| 4,625,701 A | 12/1986 | Bartlett et al. |
| 4,681,602 A | 7/1987 | Glenn et al. |
| 5,220,799 A | 6/1993 | Lievens et al. |
| 5,255,735 A | 10/1993 | Raghava et al. |
| 5,782,188 A | 7/1998 | Evans et al. |
| 5,843,212 A | 12/1998 | Nanaji |
| 5,918,679 A | 7/1999 | Cramer |
| 6,012,533 A | 1/2000 | Cramer |
| 6,182,714 B1 | 2/2001 | Ginsburgh et al. |
| 6,315,815 B1 | 11/2001 | Spadaccini et al. |
| 6,432,169 B1 | 8/2002 | Kluwe et al. |
| 6,440,317 B1 | 8/2002 | Koethe |
| 6,578,639 B1 | 6/2003 | Osime et al. |
| 6,705,092 B1 | 3/2004 | Zhou et al. |
| 6,729,359 B2 | 5/2004 | Jones |
| 6,840,292 B2 | 1/2005 | Hart et al. |
| 6,854,688 B2 | 2/2005 | McElroy et al. |
| 7,172,156 B1 | 2/2007 | Jones |
| 7,208,239 B2 | 4/2007 | Hoffjann et al. |
| 7,445,659 B2 | 11/2008 | Schwalm |
| 7,459,081 B2 | 12/2008 | Koenig et al. |
| 7,517,388 B2 | 4/2009 | Jensvold |
| 7,595,019 B2 | 9/2009 | Cutler et al. |
| 7,628,965 B2 | 12/2009 | Johnson et al. |
| 7,694,916 B2 | 4/2010 | Limaye et al. |
| 7,806,966 B2 | 10/2010 | Bose |
| 7,815,148 B2 | 10/2010 | Kwok |
| 7,896,292 B2 | 3/2011 | Limaye et al. |
| 7,905,259 B2 | 3/2011 | Johnson et al. |
| 7,918,358 B2 | 4/2011 | Gupta |
| 8,147,579 B2 | 4/2012 | Defrancesco |
| 8,192,532 B1 | 6/2012 | Gupta |
| 8,245,978 B1 | 8/2012 | Beers et al. |
| 8,388,740 B2 | 3/2013 | Sohn et al. |
| 8,499,567 B2 | 8/2013 | Hagh et al. |
| 8,500,878 B2 | 8/2013 | Cremers et al. |
| 8,567,516 B2 | 10/2013 | Bleil et al. |
| 8,602,362 B2 | 12/2013 | Buchwald |
| 8,763,712 B2 | 7/2014 | Kotliar |
| 8,801,831 B1 | 8/2014 | Snow, Jr. et al. |
| 8,813,860 B2 | 8/2014 | Bleil et al. |
| 8,882,886 B2 | 11/2014 | Evosevich et al. |
| 8,904,669 B2 | 12/2014 | Tichborne et al. |
| 8,925,865 B2 | 1/2015 | Stolte et al. |
| 8,950,703 B2 | 2/2015 | Bayliss et al. |
| 9,016,078 B2 | 4/2015 | Gupta |
| 9,096,326 B2 | 8/2015 | Dooley et al. |
| 9,114,886 B2 | 8/2015 | Gupta |
| 9,118,054 B2 | 8/2015 | Gummalla et al. |
| 9,120,571 B2 | 9/2015 | Kshirsagar et al. |
| 9,174,740 B2 | 11/2015 | Stolte et al. |
| 9,186,622 B1 | 11/2015 | Ranjan et al. |
| 9,216,931 B1 | 12/2015 | Su |
| 9,340,297 B2 | 5/2016 | Cao |
| 9,511,874 B2 | 12/2016 | Tiger |
| 9,687,773 B2 | 6/2017 | Johnson et al. |
| 2002/0117052 A1 | 8/2002 | Beers |
| 2002/0152889 A1 | 10/2002 | Baker et al. |
| 2002/0160240 A1 | 10/2002 | Matsui et al. |
| 2003/0196645 A1 | 10/2003 | Kojima et al. |
| 2004/0226438 A1 | 11/2004 | Jones |
| 2004/0262455 A1 | 12/2004 | Picot et al. |
| 2005/0048334 A1 | 3/2005 | Sridhar et al. |
| 2005/0247197 A1 | 11/2005 | Snow, Jr. |
| 2006/0011063 A1 | 1/2006 | Zhou |
| 2006/0113248 A1 | 6/2006 | Koenig et al. |
| 2007/0039464 A1 | 2/2007 | Vanderhoof et al. |
| 2008/0128048 A1 | 6/2008 | Johnson et al. |
| 2008/0176174 A1 | 7/2008 | White et al. |
| 2009/0050743 A1 | 2/2009 | Barbosa et al. |
| 2009/0227195 A1 | 9/2009 | Buelow et al. |
| 2009/0321090 A1 | 12/2009 | Bleil et al. |
| 2009/0325014 A1 | 12/2009 | Newkirk |
| 2010/0006048 A1 | 1/2010 | Minty et al. |
| 2010/0107877 A1 | 5/2010 | Suzuki et al. |
| 2010/0155315 A1 | 6/2010 | Partridge et al. |
| 2010/0252005 A1 | 10/2010 | Kitamoto et al. |
| 2011/0003224 A1 | 1/2011 | Scheibert |
| 2011/0014536 A1 | 1/2011 | Yoshida |
| 2011/0262309 A1 | 10/2011 | Limaye et al. |
| 2011/0263035 A1 | 10/2011 | Beeson |
| 2011/0309040 A1 | 12/2011 | Vu et al. |
| 2012/0035406 A1 | 2/2012 | Lam et al. |
| 2012/0273239 A1 | 11/2012 | Brennan |
| 2012/0279395 A1 | 11/2012 | K-Wlam et al. |
| 2012/0292058 A1 | 11/2012 | Bleil et al. |
| 2012/0325811 A1 | 12/2012 | Hagh et al. |
| 2013/0008524 A1 | 1/2013 | Murabayashi et al. |
| 2013/0071594 A1 | 3/2013 | Bikson et al. |
| 2013/0098314 A1 | 4/2013 | Imran et al. |
| 2013/0139521 A1 | 6/2013 | Massey et al. |
| 2013/0161342 A1 | 6/2013 | Wong et al. |
| 2013/0168111 A1 | 7/2013 | Wong et al. |
| 2013/0214464 A1 | 8/2013 | Lancho Doncel |
| 2013/0312743 A1 | 11/2013 | Kshirsagar et al. |
| 2014/0150649 A1 | 6/2014 | Stolte et al. |
| 2014/0238501 A1 | 8/2014 | Tichborne et al. |
| 2014/0251426 A1 | 9/2014 | Bando et al. |
| 2014/0252171 A1 | 9/2014 | Dooley et al. |
| 2014/0272659 A1 | 9/2014 | Lu et al. |
| 2014/0366950 A1 | 12/2014 | Haskins et al. |
| 2015/0000523 A1 | 1/2015 | Jojic et al. |
| 2015/0017557 A1 | 1/2015 | Hoffjann et al. |
| 2015/0034768 A1 | 2/2015 | Hashimoto et al. |
| 2015/0132214 A1 | 5/2015 | Eickhoff |
| 2015/0217153 A1 | 8/2015 | Jones |
| 2015/0285670 A1 | 10/2015 | Takahashi et al. |
| 2015/0308383 A1* | 10/2015 | Hoffjann .................. F02K 3/06 60/269 |
| 2015/0314229 A1 | 11/2015 | Johnson et al. |
| 2015/0344146 A1 | 12/2015 | Theodore et al. |
| 2015/0349356 A1 | 12/2015 | Ribarov et al. |
| 2015/0353201 A1 | 12/2015 | Hagh et al. |
| 2016/0009406 A1 | 1/2016 | Burnell et al. |
| 2016/0009408 A1 | 1/2016 | Fukuda |
| 2016/0030781 A1 | 2/2016 | Hoffjann et al. |
| 2016/0051926 A1 | 2/2016 | Burnell et al. |
| 2016/0052639 A1 | 2/2016 | Burnell et al. |
| 2016/0064751 A1 | 3/2016 | Hoffjann et al. |
| 2016/0102032 A1 | 4/2016 | Du et al. |
| 2016/0102261 A1 | 4/2016 | Lam et al. |
| 2016/0144973 A1 | 5/2016 | Darling et al. |
| 2016/0167802 A1 | 6/2016 | Lo et al. |
| 2016/0176535 A1 | 6/2016 | Family et al. |

(56) References Cited

U.S. PATENT DOCUMENTS

| | | |
|---|---|---|
| 2016/0257419 A1 | 9/2016 | Artaud et al. |
| 2016/0361684 A1 | 12/2016 | Ranjan et al. |
| 2017/0122275 A1 | 5/2017 | Ishimitsu et al. |
| 2017/0145969 A1 | 5/2017 | Ishimitsu et al. |
| 2017/0167036 A1 | 6/2017 | Tew et al. |
| 2017/0283083 A1 | 10/2017 | Behbahani-Pour |
| 2017/0297734 A1 | 10/2017 | Vialle et al. |
| 2017/0341019 A1 | 11/2017 | Rheaume |
| 2017/0368496 A1 | 12/2017 | Rheaume et al. |
| 2018/0016025 A1 | 1/2018 | Rheaume et al. |
| 2018/0094557 A1 | 4/2018 | Zopey et al. |
| 2018/0118366 A1 | 5/2018 | Cordatos et al. |
| 2018/0118367 A1 | 5/2018 | Rheaume et al. |
| 2018/0127110 A1 | 5/2018 | Cordatos et al. |
| 2018/0151845 A1 | 5/2018 | Jeong et al. |
| 2018/0297714 A1 | 10/2018 | Williams |
| 2019/0001264 A1 | 1/2019 | Rheaume et al. |

FOREIGN PATENT DOCUMENTS

| | | |
|---|---|---|
| DE | 102013100803 A1 | 7/2014 |
| EP | 3023518 A1 | 5/2016 |
| EP | 3260373 A1 | 12/2017 |
| EP | 3315412 A1 | 5/2018 |
| EP | 3320954 A1 | 5/2018 |
| JP | 2004022487 A | 1/2004 |
| UA | 1395691 | 5/1975 |
| WO | 9635634 A1 | 11/1996 |
| WO | 2011117610 A1 | 9/2011 |

OTHER PUBLICATIONS

European Extended Search Report dated Oct. 12, 2017 cited in Application No. 17170089.1, 7 pgs.
European Extended Search Report dated Jan. 12, 2018 cited in Application No. 17199212.6, 14 pgs.
European Extended Search Report dated Nov. 23, 2017 cited in Application No. 17177967.1, 7 pgs.
European Extended Search Report dated Mar. 13, 2018 cited in Application No. 17171470.2, 12 pgs.
European Extended Search Report dated Mar. 14, 2018 cited in Application No. 17200886.4, 9 pgs.
European Partial Search Report dated Nov. 30, 2017 cited in Application No. 17171470.2, 16 pgs.
Perry et al., "Perrys-Chemical-Engineers-handbook", Alternative Separation Processes, McGraw-Hill, 7th Ed., 1999, p. 22-64.
Balster et al., "Effects of Temerature on Formation of Insolubles in Aviation Fuels," The American Society of Mechanical Engineers, Presented at the International Gas Turbine and Aeroengine Congress & Exhibition, Orlando, FL, Jun. 2-5, 1997, 6 pgs.
Woodford, "Heat exchangers," Jan. 17, 2016; https://web.archive.org/web/20161030205435/http://www.explainthatstuff.com/how-heat-exchangers-work.html; 7 pgs.
European Search Report in European Application No. 17199034.4 dated Jan. 10, 2018; 18 Pages.
U.S. Final Office Action for U.S. Appl. No. 15/798,125, dated Apr. 23, 2021, 13 pages.

* cited by examiner

ON-BOARD AIRCRAFT ELECTROCHEMICAL SYSTEM

RELATED APPLICATION

This is a division of U.S. application Ser. No. 15/151,132, filed May 10, 2016, the entire disclosure of which is incorporated herein by reference.

BACKGROUND

This disclosure relates to aircraft systems, and in particular to an on-board aircraft electrochemical system.

It is recognized that fuel vapors within fuel tanks become combustible in the presence of oxygen. An inerting system decreases the probability of combustion of flammable materials stored in a fuel tank by maintaining a chemically non-reactive or inert gas, such as nitrogen-enriched air, in the fuel tank vapor space also known as ullage. Three elements are required to initiate and sustain combustion: an ignition source (e.g., heat), fuel, and oxygen. Combustion may be prevented by reducing any one of these three elements. If the presence of an ignition source cannot be prevented within a fuel tank, then the tank may be made inert by: 1) reducing the oxygen concentration, 2) reducing the fuel concentration of the ullage to below the lower explosive limit (LEL), or 3) increasing the fuel concentration to above the upper explosive limit (UEL). Many systems reduce the risk of combustion by reducing the oxygen concentration by introducing an inert gas such as nitrogen-enriched air (NEA) to the ullage, thereby displacing oxygen with a mixture of nitrogen and oxygen at target thresholds for avoiding explosion or combustion.

It is known in the art to equip aircraft with onboard inert gas generating systems, which supply nitrogen-enriched air to the vapor space (i.e., ullage) within the fuel tank. The nitrogen-enriched air has a substantially reduced oxygen content that reduces or eliminates combustible conditions within the fuel tank. Onboard inert gas generating systems typically use membrane-based gas separators. Such separators contain a membrane that is permeable to oxygen molecules, but relatively impermeable to nitrogen molecules. A pressure differential across the membrane causes oxygen molecules from air on one side of the membrane to pass through the membrane, which forms oxygen-enriched air (OEA) on the low-pressure side of the membrane and NEA on the high-pressure side of the membrane. The requirement for a pressure differential necessitates a source of compressed or pressurized air. Bleed air from an aircraft engine or from an onboard auxiliary power unit can provide a source of compressed air; however, this can reduce available engine power and also must compete with other onboard demands for compressed air, such as the onboard air environmental conditioning system. Moreover, certain flight conditions such as during aircraft descent can lead to an increased demand for NEA at precisely the time when engines could be throttled back for fuel savings so that that maintaining sufficient compressed air pressure for meeting the pneumatic demands may come at a significant fuel burn cost. Additionally, there is a trend to reduce or eliminate bleed-air systems in aircraft; for example Boeing's 787 has a no-bleed systems architecture, which utilizes electrical systems to replace most of the pneumatic systems in order to improve fuel efficiency, as well as reduce weight and lifecycle costs. A separate compressor or compressors can be used to provide pressurized air to the membrane gas separator, but this undesirably increases aircraft payload, and also represents another onboard device with moving parts that is subject to maintenance issues or device failure. Additionally, the membranes in such gas separators are subject to fouling over time.

The concern with combustion as a significant risk management issue for aircraft is not limited to the fuel tanks, and commercial and military aircraft are often equipped with fire suppression technology such as halocarbon systems that disperse a halocarbon such as Halon 1301 as a clean fire suppressant. Halocarbons interrupt the chain reactions that propagate the combustion process. Unfortunately, although halocarbons are deleterious to the ozone layer and are furthermore greenhouse gases, it has been difficult to discontinue their use because of a dearth of viable alternatives. Typically multiple tanks of Halon are on board aircraft for fire suppression with respect to both the initial inrush (knockdown) as well as for the replacement of Halon and air lost to leakage at a low rate of discharge (LRD).

BRIEF DESCRIPTION

According to some embodiments of this disclosure, an onboard aircraft electrochemical system comprises an electrochemical cell comprising a cathode and an anode separated by an electrolyte separator. A cathode fluid flow path is in fluid communication with the cathode, and discharges nitrogen-enriched air. A nitrogen-enriched air flow path receives nitrogen-enriched air from the cathode fluid flow path and delivers it to a fuel tank, a fire suppression system, or to both a fuel tank and a fire suppression system. A first anode flow path is configured to controllably direct water or air to the anode. A second anode flow path is configured to controllably direct fuel to the anode. An electrical connection is in controllable communication between an electric power source and the cathode and anode, and an electrical connection is in controllable communication between an electric power sink and the cathode and anode. A controller is operatively connected to various components of the system and is configured to alternatively operate the electrochemical cell in either of two modes. In a first operation mode, water or air is directed to the anode from the first anode flow path, electric power is directed from the power source to the anode and cathode to provide a voltage difference between the anode and the cathode, and nitrogen-enriched air is directed from the cathode to the fuel tank or the fire suppression system. In a second mode, fuel is directed to the anode from the second anode flow path, electric power is directed from the anode and cathode to the power sink, and nitrogen-enriched air is directed from the cathode to the fuel tank, fire suppression system, or fuel tank and fire suppression system.

In some embodiments of the disclosure, a method of operating an on-board aircraft electrochemical system comprises selectively operating an electrochemical cell comprising a cathode and an anode separated by an electrolyte separator in either of two modes. In a first mode of operation, water or air is directed to the anode, electric power is provided to the anode and cathode to provide a voltage difference between the anode and the cathode, and nitrogen-enriched air is directed from the cathode to a fuel tank or a fire suppression system. In a second mode of operation, fuel is directed to the anode, electric power is directed from the anode and cathode to one or more on-board electric power-consuming systems or components, and nitrogen-enriched air is directed from the cathode to the fuel tank, the fire suppression system, or the fuel tank and fire suppression system.

BRIEF DESCRIPTION OF THE DRAWINGS

Subject matter of this disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
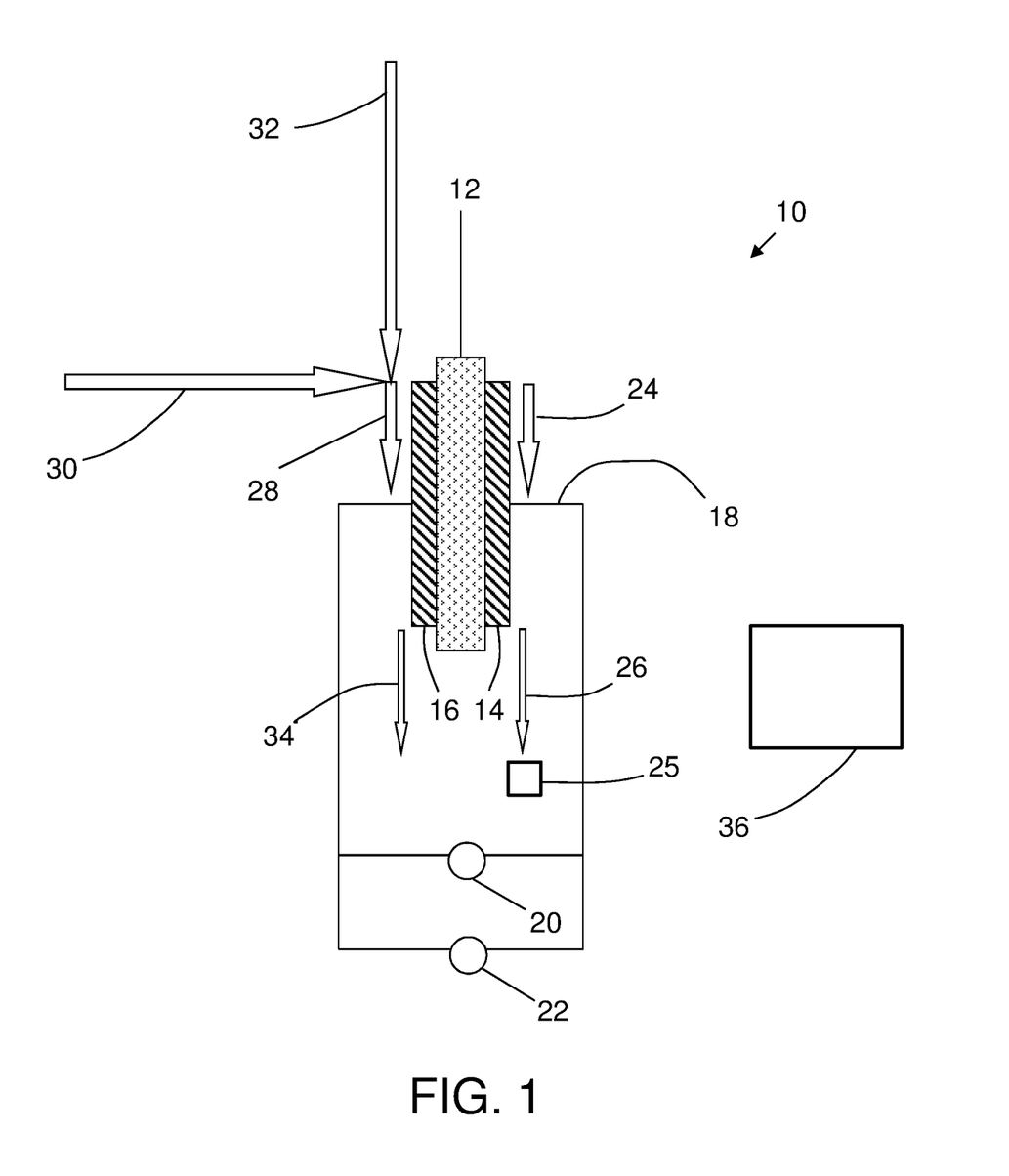
FIG. 1 is a schematic depiction of an example embodiment of an electrochemical system.

Referring now to the Figures, in which the same numbering may be used in more than one Figure to represent the same feature without the necessity of explicit repetition of the description for each Figure, FIG. 1 schematically depicts an electrochemical cell 10. The electrochemical cell 10 comprises an electrolyte 12 having a cathode 14 disposed on one side and an anode 16 disposed on the other side. Cathode 14 and anode 16 are positioned adjacent to, and preferably in contact with the electrolyte 12 and can be solid metal layers deposited (e.g., by vapor deposition) onto the electrolyte 12, or can have structures comprising discrete catalytic particles adsorbed onto a porous substrate that is attached to the electrolyte 12. Alternatively, the catalyst particles can be deposited on high surface area powder materials (e.g., graphite or porous carbons or metal-oxide particles) and then these supported catalysts may be deposited directly onto the electrolyte 12 or onto a porous substrate that is attached to the electrolyte 12. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of the electrolyte 12. In either case, the cathode and anode layers 14 and 16 may also include a binder material, such as a polymer, especially one that also acts as an ionic conductor. In this case, the cathode and anode layers 14 and 16 may be cast from an "ink," which is a suspension of supported (or unsupported) catalyst, ionomer, and a solvent that is typically an aqueous solution (e.g., a mixture of alcohol(s) and water) using processes that are like those used to make catalyst layers used in conjunction with electrolytes in fuel cells. Cathode 14 and anode 16 can be fabricated from catalytic materials suitable for performing the needed electrochemical reaction (e.g., the oxygen-reduction reaction on the cathode and the electrolysis of water on the anode). Exemplary catalytic materials include, but are not limited to, platinum, palladium, rhodium, carbon, gold, tantalum, tungsten, ruthenium, iridium, osmium, alloys thereof, and the like, as well as combinations of the foregoing materials.

The cathode 14 and anode 16 can be controllably electrically connected by electrical circuit 18 to an electric power source 20 (e.g., DC power rectified from AC power produced by a generator powered by a gas turbine engine used for propulsion or by an auxiliary power unit) or to an electric power sink 22 (e.g., one or more electricity-consuming systems or components onboard the aircraft), or power bus(es) for such on-board electricity-consuming systems or components. In some embodiments, the electrical circuit 18 can connect to an electrical power sink 22 in the form of an on-board DC power bus (e.g., a 28 volt power bus commonly used on commercial aircraft). In some embodiments, the electrical circuit 18 can be connected to an electrical power sink 22 in the form of an on-board AC power bus (or a portion of an AC bus) through a power conditioner that includes an inverter (not shown) that converts DC power produced by the electrochemical cell to AC power that may be required by aircraft systems or components. Control of this connection can be implemented through electrical switches (not shown).

A cathode fluid flow path 24 directs air from an external source (e.g., fan, compressor, ram air flow) into contact with the cathode 14. Oxygen is electrochemically depleted from air along the cathode fluid flow path 24, and is discharged as nitrogen-enriched air (NEA) at cathode exhaust 26 for delivery to either or both of an aircraft fuel tank or on-board fire suppression system 25. An anode fluid flow path 28 is configured to controllably receive water along a first anode flow path 30 if the electrochemical cell is configured for proton transfer across the electrolyte 12 (e.g., a proton exchange membrane (PEM) electrolyte or phosphoric acid electrolyte), or to receive cooling air along the anode flow path 30 if the electrochemical cell is configured for oxygen anion transfer across the electrolyte 12 (e.g., a solid oxide electrolyte). The anode fluid flow path 28 is also configured to controllably receive fuel (e.g., hydrogen for a proton-transfer cell, hydrogen or hydrocarbon reformate for a solid oxide cell) along a second flow path 32. Anode exhaust 34 can, depending on the type of fuel cell and the anode exhaust content, be exhausted or subjected to further processing. Control of fluid flow along these flow paths can be effected through conduits and valves (not shown).

Figure 2:
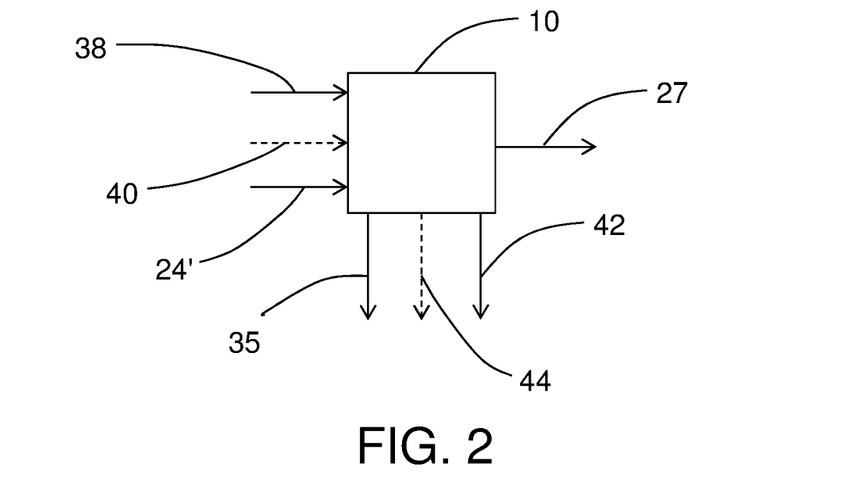
FIG. 2 is a schematic depiction of a first operating mode as described herein.
Figure 3:
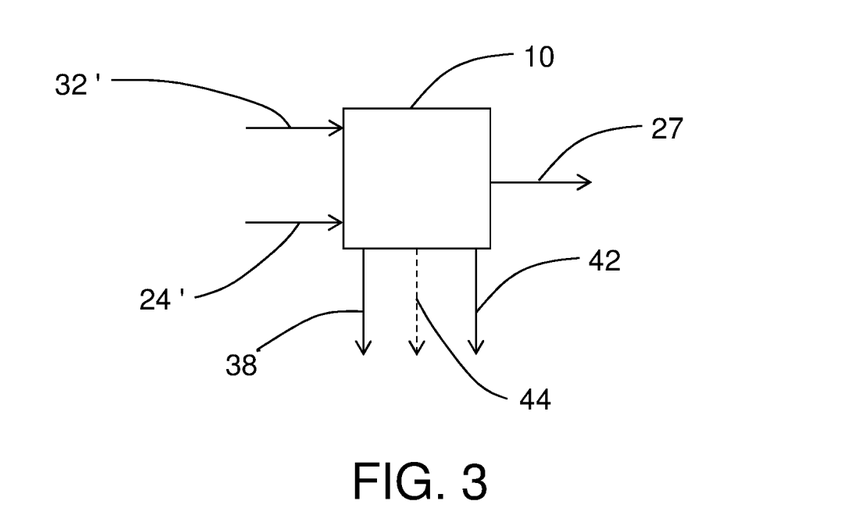
FIG. 3 is a schematic depiction of a second operating mode as described herein.

A controller 36 is in operative communications with valves, pumps, compressors, or other fluid flow components and with switches and other electrical system components to selectively operate the electrochemical cell in either a first mode or a second mode. These control connections can be through wired electrical signal connections (not shown) or through wireless connections. A first operational mode, which can also be referred to as an electrolyzer mode (for separation of oxygen from air along the cathode fluid flow path) is schematically depicted in FIG. 2. As shown in FIG. 2, in this mode of operation the electrochemical cell receives principal inputs of air 24', electricity 38, and (in the case of a proton transfer electrolyte) water 40, and produces principal outputs of oxygen 35, heat 42, NEA 27, and in the case of a proton transfer electrolyte, water as part of stream of NEA 27 and as part of a flow path for water and thermal management 44 (e.g., removing condensed water from the NEA as the NEA cools such as in a condenser, or water removal with a membrane separator). A second operational mode, which can also be referred to as a fuel cell mode, is schematically depicted in FIG. 3. As shown in FIG. 3, in this mode of operation the electrochemical cell receives principal inputs of air 24' and fuel 32', and produces principal outputs of electricity 38, heat 42, NEA 27, and water 44. In the case of a proton transfer electrolyte, the water output 44 may be part of stream of NEA 27 and as part of a flow path for water and thermal management 44, and in the case of a solid oxide electrolyte, the water 44 as part of the anode exhaust 34 (FIG. 1).

In some embodiments, the electrochemical cell 10 can operate utilizing the transfer of protons across the electrolyte 12. Exemplary materials from which the electrochemical proton transfer electrolytes can be fabricated include proton-conducting ionomers and ion-exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION™ resins (commercially available from E. I. du Pont de Nemours and Company, Wilmington, Del.). Alternatively, instead of an ion-exchange membrane, the electrolyte 12 can be comprised of a liquid electrolyte, such as sulfuric or phosphoric acid, which may preferentially be absorbed in a porous-solid matrix material such as a layer of silicon carbide or a polymer than can absorb the liquid electrolyte, such as poly(benzoxazole). These types of alternative "membrane electrolytes" are well known and have been used in other electrochemical cells, such as phosphoric-acid fuel cells.

During operation of a proton transfer electrochemical cell in the electrolyzer or first mode of operation, water at the anode undergoes an electrolysis reaction according to the formula (1): $H_2O \rightarrow \frac{1}{2}O_2 + 2H^+ + 2e^-$. The electrons produced by this reaction are drawn from an electrical circuit 18 powered by electric power source 20 connecting the positively charged anode 16 with the cathode 14. The hydrogen ions (i.e., protons) produced by this reaction migrate across the electrolyte 12, where they react at the cathode 14 with oxygen in the cathode flow path 24 to produce water according to the formula (2): $\frac{1}{2}O_2 + 2H^+ + 2e^- \rightarrow H_2O$. Removal of oxygen from cathode flow path 24 produces nitrogen-enriched air exiting the region of the cathode 14. The oxygen evolved at the anode 16 by the reaction of formula (1) is discharged as oxygen or an oxygen-enriched air stream as anode exhaust 34.

During operation of a proton transfer electrochemical cell in the fuel cell or second mode of operation, fuel (e.g., hydrogen) at the anode undergoes an electrochemical oxidation according to the formula (3): $H_2 \rightarrow 2H^+ + 2e^-$. The electrons produced by this reaction flow through electrical circuit 18 to provide electric power to electric power sink 22. The hydrogen ions (i.e., protons) produced by this reaction migrate across the electrolyte 12, where they react at the cathode 14 with oxygen in the cathode flow path 24 to produce water according to the formula (2). Removal of oxygen from cathode flow path 24 produces nitrogen-enriched air exiting the region of the cathode 14. Any unreacted hydrogen that exits anode 16 via anode exhaust flow path 34 can be recycled to fuel flow path 32 using an ejector or blower (not shown).

As mentioned above, the electrolysis reaction occurring at the positively charged anode 16 requires water, and the ionic polymers used for a PEM electrolyte perform more effectively in the presence of water. Accordingly, in some embodiments, a PEM membrane electrolyte is saturated with water or water vapor. Although the reactions (1) and (2) are stoichiometrically balanced with respect to water so that there is no net consumption of water, in practice moisture will be removed by NEA 24 (either entrained or evaporated into the nitrogen-enriched air) as it exits from the region of cathode 14. Accordingly, in some exemplary embodiments, water is circulated past the anode 16 along an anode fluid flow path (and optionally also past the cathode 14). Such water circulation can also provide cooling for the electrochemical cells. In some exemplary embodiments, water can be provided at the anode from humidity in air along an anode fluid flow path in fluid communication with the anode. In other embodiments, the water produced at cathode 14 can be captured and recycled to anode 16 (not shown). It should also be noted that, although the embodiments are contemplated where a single electrochemical cell is employed, in practice multiple electrochemical cells will be electrically connected in series with fluid flow to the multiple cathode and anode flow paths routed through manifold assemblies.

In some embodiments, the electrochemical cell 10 can operate utilizing the transfer of oxygen anions across the electrolyte 12. Exemplary materials from which the electrochemical oxygen anion-transporting electrolytes can be fabricated include solid oxides such as yttria-stabilized zirconia and/or ceria doped with rare earth metals. These types of materials are well known and have been used in solid oxide fuel cells (SOFC).

During operation of an oxygen anion transfer electrochemical cell in the electrolyzer or first mode of operation, oxygen at the cathode undergoes an electrochemical reduction reaction according to the formula (4): $\frac{1}{2}O_2 + 2e^- \rightarrow O^=$. The electrons consumed by this reaction are drawn from an electrical circuit 18 powered by electric power source 20 connecting the positively charged anode 16 with the cathode 14. The oxygen anions produced by this reaction migrate across the electrolyte 12, where they undergo an electrochemical oxidation reaction at the anode 14 according to the formula (5): $O^= \rightarrow \frac{1}{2}O_2 + 2e^-$. Removal of oxygen from cathode flow path 24 produces nitrogen-enriched air exiting the region of the cathode 14. The oxygen produced at the anode 16 by the reaction of formula (5) is discharged as oxygen or an oxygen-enriched air stream as anode exhaust 34.

During operation of an oxygen ion transfer electrochemical cell in the fuel cell or second mode of operation, oxygen at the cathode undergoes an electrochemical reduction reaction according to the formula (4). The electrons consumed by this reaction are drawn from electrons liberated at the anode, which flow through electrical circuit 18 to provide electric power to electric power sink 22. The oxygen anions produced by this reaction migrate across the electrolyte 12, where they react with fuel such as hydrogen at the anode according to the formula (6): $H_2 + O^= \rightarrow H_2O + 2e^-$ Carbon monoxide (e.g., contained in fuel reformate) can also serve as fuel in solid oxide electrochemical cells. In this case, the oxygen anions produced at the cathode according to formula (4) migrate across the electrolyte 12 where they react with carbon monoxide at the anode according to the formula (7): $CO + O^= \rightarrow CO_2 + 2e^-$. Removal of oxygen from cathode flow path 24 produces nitrogen-enriched air exiting the region of the cathode 14. The steam and carbon dioxide produced at the anode 16 by the reactions of formulas (6) and (7) respectively is discharged along with unreacted fuel as anode exhaust 34. The unreacted fuel that exits anode 16 via anode exhaust flow path 34 can be recycled to fuel flow path 32 using an ejector or blower (not shown). It can also be fed to a fuel processing unit wherein the steam contributes to reforming.

Depending on whether a proton transfer cell or an oxygen ion transfer cell is utilized, several technical issues can arise. In the case of a proton transfer cell, the NEA produced at the cathode can contain significant amounts of water. Accordingly, in some embodiments, a system utilizing a proton transfer cell can include a dryer in fluid communication with the cathode exhaust 26 bound for the fuel tank/fire suppression system 25 as shown in FIG. 1. Examples of dryers can include a desiccant, a heater, a heat absorption side of a heat exchanger, a separation membrane, or combinations thereof. In some embodiments, the water removed from the cathode exhaust 26 is recovered for use at the anode during the electrolyzer or first mode of operation.

Figure 4:
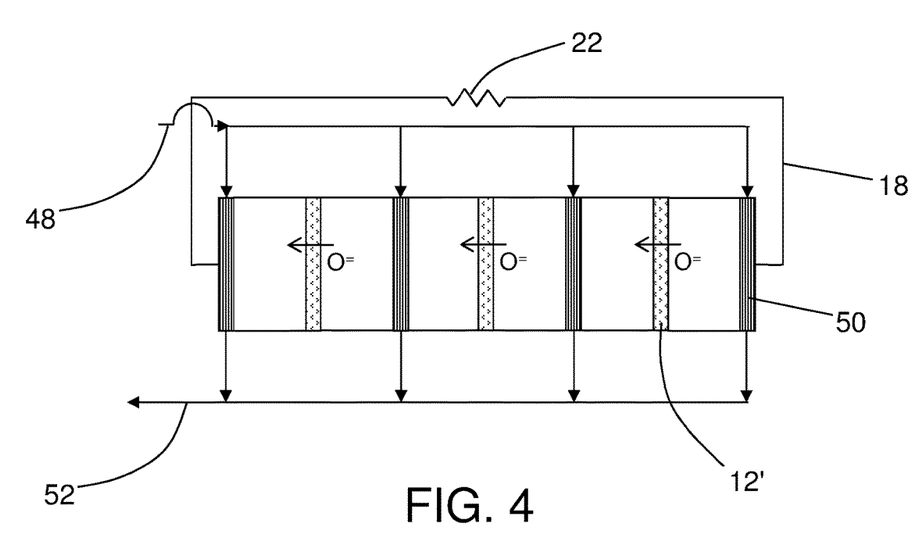
FIG. 4 is a schematic depiction of a solid oxide electrochemical cell stack with cooling gas flow through bipolar separator passages.
Figure 5:
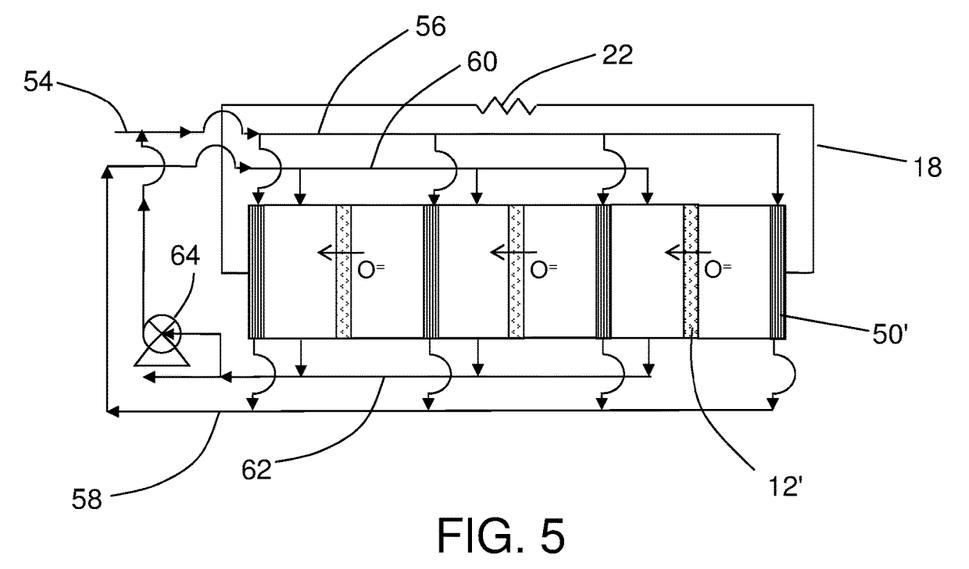
FIG. 5 is a schematic depiction of a solid oxide electrochemical stack utilizing endothermic steam reforming for cooling.

In the case of an oxygen ion transfer cell, a technical issue of heat management can arise, as solid oxide electrochemical cells typically operate at high temperatures (e.g., up to 1000° C.). One of the most common techniques for heat removal from a solid oxide fuel cell is by increasing air flow across the cathode; however, an increase in the cathode air flow rate will also tend to increase the oxygen concentration of the NEA exiting the region of the cathode, which may limit its potential impact for removing heat. During operation in the electrolyzer or first mode, heat can be absorbed by increasing air flow across the anode side of the solid oxide electrolyte 12'. Other cooling modalities can be utilized for operation in the fuel cell or second mode. In some embodiments, a system utilizing an oxygen ion transfer electrochemical cell can include a cooling gas flow path that is isolated from the cathode flow path. Example embodiments of this approach are schematically depicted in FIGS. 4 and 5, where a stack of fuel cells formed by repeating modules comprising solid oxide electrolyte 12' and bipolar separators (e.g., separator plates) 50/50'. The alignment of the electrodes (not shown) on each solid oxide electrolyte 12' is indicated by the flow direction of $O^=$ anions, with the cathode on the right of hand side of each solid oxide electrolyte 12' and the anode on the left hand side of each solid oxide electrolyte 12', as depicted in FIGS. 4 and 5. Electrical circuit 18 is connected to electric power sink 22 for operation in the fuel cell or second mode of operation.

In the example embodiment of FIG. 4, a flow of cooling air 48, including any air flow having a lower temperature than the core temperature of the electrochemical cell stack, is directed into one or more internal passages (not shown) in the bipolar separators 50, where it absorbs heat from the higher surrounding temperatures. The cooling air flow 52 can be exhausted to the outside or can be used onboard for further thermodynamic processing. In the example embodiment of FIG. 5, one or more internal passages (not shown) in the bipolar separators 50' can include a reforming catalyst (e.g., nickel, noble metals, etc.) to provide heat absorption by an endothermic steam reforming process. In operation, the reforming process is provided with a hydrocarbon fuel 54, which is mixed with steam contained in the portion of anode exhaust gas pumped by blower 64 from anode exhaust manifold 62, and directed into manifold 56, from which it is directed into internal passages in the bipolar separators 50' where it contacts the reformer catalyst and is heated by surrounding temperatures, resulting in an endothermic steam reforming reaction that absorbs heat from the stack core and removes it with the flow of reformate exiting the internal passages of the bipolar separators 50'. The reformate fluid exiting the bipolar separators 50' enters reformate manifold 58, from where it is directed to manifold 60 as fuel for the anodes. In another embodiment, the reformate leaves the bipolar separators and directly enters the anodes. This is advantageous when each cell has a reforming bipolar separator, however, for reasons of energy balance and cost, one reforming bipolar separator may serve numerous cells thus requiring the aforementioned reformate manifold 58. At the anodes, hydrogen in the reformate reacts with oxygen anions to form water, and carbon monoxide in the reformate reacts with oxygen anions to form $CO_2$ plus water. Both oxidation reactions involve a transfer of electrons which are collected from the anode and passed through electric circuit 18.

Figure 6:
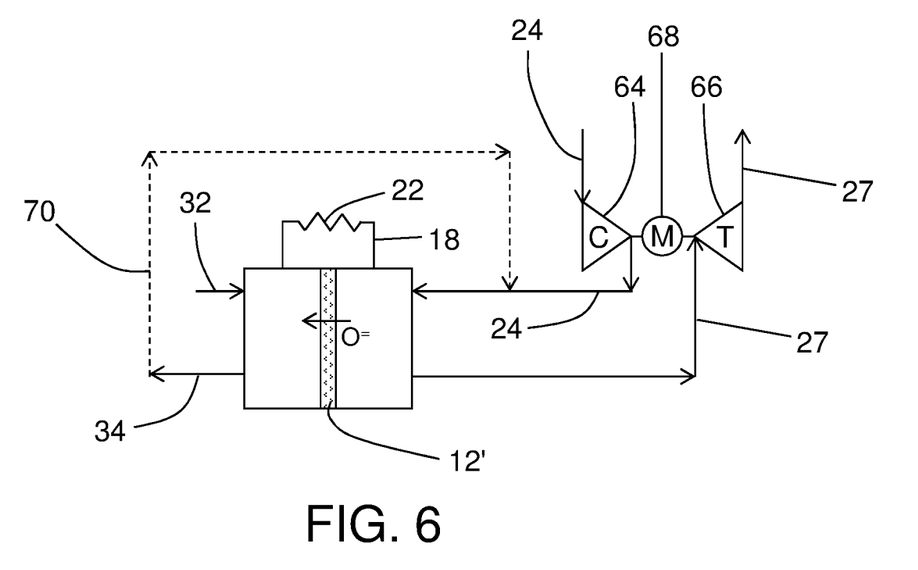
FIG. 6 is a schematic depiction of integration of a solid oxide electrochemical stack integrated with a turbocompressor.

Another technical issue with solid oxide electrochemical cells and proton transfer electrochemical cells relates to providing air flow to the cathode at target pressures. An example embodiment for providing compressed air is schematically depicted in FIG. 6. As shown in FIG. 6, a turbocompressor comprising a compressor section 64, a turbine section 66, and a motor assist section 68 is integrated with an electrochemical cell having features identified as in FIG. 1. For ease of illustration, a single chemical cell is depicted in FIG. 6 integrated with a turbocompressor, but it is understood that a stack comprising multiple cells could be used instead of a single cell. Air flowing to the cathode along cathode flow path 24 is compressed in compressor section 64, and the NEA exiting from cathode at cathode exhaust 26 is expanded in turbine section 66. Work extracted by turbine 66 is used along with an assist from motor section 68 to drive the compressor section 64. Anode side fluid flows are as depicted in FIG. 1, except that in the case of a solid oxide electrochemical cell, some of the anode exhaust along anode exhaust flow path 34 can be directed along flow path 70 to the cathode flow path 24 in fuel cell mode to pre-heat the air on the cathode flow path 24 to promote migration of oxygen ions across the electrolyte 12 and to promote higher power output from turbine section 68.

In some embodiments, the system can be operated in the first or electrolyzer mode during conditions when the aircraft does not require the production of electrical power by the electrochemical cell (e.g., normal operating conditions), and in the second or fuel cell mode during a designated aircraft operating condition requiring the production of electrical power by the electrochemical cell (e.g., Emergency Power System (EPS), Fire Suppression Low Rate of Discharge (LRD). In some embodiments, in addition to supplying NEA to the ullage of the fuel tank(s) onboard the aircraft and electricity to onboard systems and components when needed, the NEA may be also be used for other functions, such as serving as a fire-suppression agent. For example, cargo compartments, engines, and toilet waste bins on board aircraft typically have fire-suppression systems that include a dedicated gas-distribution system comprising tubes routed to nozzles in the cargo bay to deploy fire-suppression agents in the event of a fire. A variety of fire-suppression agents may be deployed depending on the type and extent of the fire. In the case of a fire, all or some of the NEA could be routed to one or more of these fire-suppression distribution systems. This may be especially beneficial during the aircraft descent when the cargo bay is becoming re-pressurized to reduce the ingress of oxygen that can feed a fire. In this case, the system may be operated to produce NEA at the maximum flow rate. The NEA could also be used to enable inerting coverage over extended periods, which may be in addition to, or in lieu of, dedicated low-rate discharge inerting systems in the cargo bay(s). In some embodiments, this would have the technical effect of reducing the amount of ozone layer-depleting halogenated compounds, which are known greenhouse gases, required on the aircraft for fire suppression.

During operation, the system can be controlled to set fluid flow rates (e.g. air, fuel, or water feed rates) and the current or voltage levels required by the electric power sink 22 in the first mode of operation or produced by electric power source 20 in the second mode of operation, to produce varying amounts of NEA in response to system parameters. Such system parameters can include, but are not limited to temperature of the fuel in the aircraft fuel tank(s), oxygen content of the fuel in the fuel tanks, oxygen content of vapor in the ullage of fuel tanks, temperature rise in an enclosed space such as a cargo hold or avionics bay, smoke and/or flame detection in said enclosed spaces, and temperature and/or pressure of vapor in the ullage of fuel tanks, and other on-board parameters such as temperature, oxygen content, and/or humidity level of air feed to the electrochemical cell. Accordingly, in some embodiments, the inert gas management system such as shown in FIGS. 3 and 4 can include sensors for measuring any of the above-mentioned fluid flow rates, temperatures, oxygen levels, humidity levels, or current or voltage levels, as well as controllable output fans or blowers, or controllable fluid flow control valves or gates. These sensors and controllable devices can be operatively connected to the controller 36, which can be an independent controller dedicated to controlling the inert gas management system or the electrochemical cell, or can interact with other onboard system controllers or with a master controller. In some embodiments, data provided by the controller of the inert gas management system can come directly from a master controller.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. An on-board aircraft electrochemical system, comprising:
 an electrochemical cell comprising a cathode and an anode separated by a solid oxide electrolyte separator;
 a cathode fluid flow path in fluid communication with the cathode that discharges nitrogen-enriched air;
 a nitrogen-enriched air flow path that receives nitrogen-enriched air from the cathode fluid flow path and delivers it to a fuel tank, a fire suppression system, or both a fuel tank and a fire suppression system;
 a first anode fluid flow path that directs air to the anode;
 a second anode fluid flow path configured that directs fuel to the anode;
 an electrical connection between an electric power source and the cathode and anode;
 an electrical connection between an electric power sink and the cathode and anode; and
 a controller programmed to alternatively operate the electrochemical cell in:
  a first mode in which air is directed to the anode from the first anode fluid flow path, electric power is directed from the power source to the anode and cathode to provide a voltage difference between the anode and the cathode, and nitrogen-enriched air is directed from the cathode to the fuel tank, the fire suppression system, or both the fuel tank and the fire suppression system, and
  a second mode in which fuel is directed to the anode from the second anode fluid flow path, electric power is directed from the anode and cathode to the power sink, and nitrogen-enriched air is directed from the cathode to the fuel tank, the fire suppression system, or both the fuel tank and the fire suppression system.

2. The system of claim 1, wherein the controller is programmed to operate the electrochemical cell continuously in either the first mode or the second mode during aircraft operation.

3. The system of claim 1, wherein the nitrogen-enriched air flow path delivers nitrogen-enriched air to the fuel tank.

4. The system of claim 1, wherein the nitrogen-enriched air flow delivers nitrogen-enriched air to either or both of the fuel tank and the fire suppression system.

5. The system of claim 1, wherein the controller is programmed to operate the electrochemical cell in the second mode during an emergency power system or fire suppression low rate of discharge, and in the first mode under normal conditions.

6. The system of claim 1, comprising a plurality of said electrochemical cells in electrical series in a stack.

7. The system of claim 1, further comprising a turbocompressor, wherein the cathode fluid flow path receives air from a compressor outlet of the turbocompressor and discharges air to a turbine inlet of the turbocompressor.

8. The system of claim 1, comprising a cooling gas flow path isolated from the cathode flow path.

9. The system of claim 8, wherein the cooling gas flow path includes an air flow path on the anode side of the electrochemical cell during the first mode of operation.

10. The system of claim 8, comprising a plurality of said electrochemical cells in a stack separated by electrically-conductive gas flow separators, wherein the cooling gas flow path includes an air flow path through a passage in one or more of the separators.

11. The system of claim 8, comprising a plurality of said electrochemical cells in a stack separated by electrically-conductive gas flow separators, wherein the cooling gas flow path includes a fuel and steam flow path through a passage in one or more of the separators comprising a reforming catalyst.

12. The system of claim 1, comprising a plurality of said electrochemical cells in a stack separated by electrically-conductive gas flow separators, wherein the cooling gas flow path comprises an air flow path across an anode of one or more electrochemical cells in the stack configured or controlled to operate in the first mode of operation when the stack as a whole is operated in the second mode of operation.

13. A method of operating an on-board aircraft electrochemical system, comprising selectively operating, via a programmed controller, an electrochemical cell comprising a cathode and an anode separated by an electrolyte separator in:
 a first mode in which water or air is directed to the anode, electric power is provided to the anode and cathode to provide a voltage difference between the anode and the cathode, and nitrogen-enriched air is directed from the cathode to an aircraft fuel tank or an aircraft fire suppression system, and
 a second mode in which fuel is directed to the anode, electric power is directed from the anode and cathode to one or more aircraft electric power-consuming systems or components, and nitrogen-enriched air is directed from the cathode to the aircraft fuel tank or aircraft fire suppression system.

14. The method of claim 13, wherein the electrochemical cell is operated continuously in either the first mode or the second mode during aircraft operation.

15. The method of claim 13, wherein the electrochemical cell is operated in the second mode during an emergency power system or fire suppression low rate of discharge, and in the first mode under normal conditions.

16. The method of claim 13, wherein the electrolyte comprises a proton transfer medium and the method includes transporting protons across the electrolyte from the anode to the cathode in each of the first and second modes.

17. The method of claim 13, wherein the electrolyte comprises a solid oxide and the method includes transporting oxygen anions across the electrolyte from the cathode to the anode in each of the first and second modes.

18. The method of claim 13, wherein the nitrogen-enriched air flow path delivers nitrogen-enriched air to the fuel tank.

19. The method of claim 13, wherein the nitrogen-enriched air flow delivers nitrogen-enriched air to either or both of the fuel tank and the fire suppression system.

20. The method of claim 13, comprising operating a plurality of said electrochemical cells in electrical series in a stack.

\* \* \* \* \*